United States Patent [11] 3,615,452

[72] Inventor Edward J. Cerwonka
 Binghamton, N.Y.
[21] Appl. No. 758,632
[22] Filed Sept. 9, 1968
[45] Patented Oct. 26, 1971
[73] Assignee GAF Corporation
 New York, N.Y.

[54] DYE-SENSITIZED PHOTOPOLYMERIZATION PROCESS
 15 Claims, No Drawings
[52] U.S. Cl................................................ 96/35.1,
 96/115 P, 96/49, 96/91 R, 204/159.24
[51] Int. Cl........................................................ G03c 1/70
[50] Field of Search............................................ 96/115 P,
 91, 35.1, 49; 204/159.23, 159.24

[56] References Cited
 UNITED STATES PATENTS
 2,875,047 2/1959 Oster............................ 96/115 X
 2,996,381 8/1961 Oster et al. ................... 96/115 X
 3,099,558 7/1963 Levinos......................... 96/115 X
 3,138,460 6/1964 Levinos......................... 96/115 X
 3,418,118 12/1968 Thommes et al. ............. 96/35.1
 FOREIGN PATENTS
 905,182 9/1962 Great Britain................ 96/115
 1,055,814 4/1959 Germany....................... 96/115

Primary Examiner—Ronald H. Smith
Attorneys—Walter C. Kehm, Samson B. Leavitt, George L. Tone and Morton Friedman ABSTRACT: A dye-sensitized photopolymerization process for vinyl monomers wherein said vinyl monomers are polymerized by means of a diazonium compound and a dye by a photo-oxidation process.

DYE-SENSITIZED PHOTOPOLYMERIZATION PROCESS

The instant invention relates to the polymerization of monomeric vinyl compounds while employing as catalysts therefor a mixture of a diazonium compound and a dye, to polymers obtained therefrom, and to photographic elements based thereon. The dye-sensitized photopolymerization of vinyl monomers has been the subject of several recent patent disclosures including U.S. Pat. Nos. 2,850,445, 3,074,794, 3,097,097, and 3,145,104.

U.S. Pat. No. 2,850,445 discloses a dye-sensitized photopolymerization process wherein vinyl compounds are contacted with a photoreducible dye and a mild reducing agent in the presence of oxygen.

U.S. Pat. No. 3,074,794 discloses a process in which a bichromate material which consists of a soluble polymer which is crosslinkable into an insoluble form by reduced bichromate and a bichromate is photopolymerized in the presence of a photoreducible dye and a reducing agent.

U.S. Pat. No. 3,097,097 also discloses a process in which a polymerizable compound is photopolymerized in the presence of a photoreducible dye and a material suitable for reducing the photoexcited dye.

U.S. Pat. No. 3,145,104 discloses the photopolymerization of thiol polymers in the presence of a dye-sensitizer, i.e a photoreducible dye.

It is noted that in the above-disclosed processes the photoreduction of the dye usually accompanies the initiation of the polymerization process. A mild reducing agent such as ascorbic acid, allylthiourea, or cysteine is usually incorporated in the system for this purpose. The reducing agents employed conventionally have reduction potentials of such a magnitude that the dyes are not reduced in the dark, while in the presence of actinic light the dye is reduced to its leuco form and the mild reducing agent is correspondingly oxidized. Other materials such as chelating agents including compounds such as ethylenediamine tetra-acetate have also served as electron donors for the light-excited dye molecules even though this type of agent is not normally regarded as a reducing agent. In connection with the majority of the above processes there is visible evidence of the photoreduction of the dye inasmuch as the dye which is bleached in light reverts to its original color in the dark when oxygen is available in the reaction medium. When a vinyl monomer is present in the dye-reducing agent or dye-chelating agent system, polymerization of the monomer accompanies the photoreduction of the dye.

As may be seen, the dye-sensitized photopolymerization of vinyl monomers accompanied by the photoreduction of the dye employed is well known in the art. As distinguished from this, the use of dye-sensitized photopolymerization processes in which the dye employed is photo-oxidized is relatively uncommon. One such process is disclosed in U.S. Pat. No. 3,147,119. The patent discloses the use of zinc oxide as a mild oxidizing agent in the dye-sensitized photopolymerization of a vinyl monomer. When the composition was exposed to actinic light, the dye was irreversibly photobleached and the vinyl monomer was polymerized. Photo-oxidation processes of this type have in the past been unpopular because they were believed to be too slow to be useful. Contrary to this general belief I have found that photo-oxidation processes may be practically employed in photographic operations. Therefore, it is an object of the instant invention to provide a dye-sensitized photopolymerization process wherein the dye employed is photo-oxidized.

Another object of the instant invention is to provide a dye-sensitized photopolymerization process wherein the dye employed is photo-oxidized.

Another object of the instant invention is to provide a dye-sensitized photopolymerization process which is practical and useful in photographic processes.

Yet a further object of the instant invention is to provide a dye-sensitized photopolymerization process for vinyl monomers wherein said monomers are contacted with a dye and a diazonium salt.

These and other objects of the instant invention will become more evident from the following more detailed disclosure of the instant invention.

In the instant dye-sensitized photopolymerization process, a diazonium salt is employed as a mild oxidizing agent. The diazonium salts have been used previously as oxidizing agents. For example, in the synthesis of aromatic hydrazine derivatives, stannous chloride or sodium sulfide are oxidized by an appropriate diazonium salt which is itself reduced in the process. Another type of reaction in which a diazonium salt is used as an oxidizing agent is in the oxidation of ethanol to acetaldehyde in an aqueous solution. Diazonium salts which are suitable in the instant invention include aromatic diazonium compounds with or without nuclear substituents which may include alkyl, alkoxy, acetamido, carboalkoxy, hydroxyl, aryl, halogen, sulfonate or sulfone groupings. In addition, compounds which contain amino or alkylamino substitutions may be employed in connection with the instant invention as may be the so-called diazo-oxides which are derived from ortho-or para-aminophenols. These latter compounds are not, however, as effective in the process as those formerly delineated. The most effective diazonium salts appear to be those which are the strongest oxidants. These include the unsubstituted diazonium salts or those possessing so-called negative or electron-attracting substituents such as phenyl or nitro. In this connection it should be remembered that the diazonium salt should not be so strong so as to oxidize the dye in the dark and yet be a strong enough oxidant so as to effect the polymerization when the composition is exposed to light. Suitable diazonium compounds may be those which are derived from aromatic amines such as are disclosed in U.S. Pat. Nos. 3,110,592, 2,807,545 and 2,772,972. These compounds which are all primary aromatic amines yield on diazotization the diazonium salts of interest. Other useful diazonium compounds include: para-diazo-dimethyl-aniline zinc chloride, p-diazo-diphenylamine sulfate, p-diazo-diethylaniline zinc chloride, p-diazo-ethyl-hydroxyethylaniline zinc chloride, p-diazo-ethyl-methyl-aniline zinc chloride, p-diazo-diethyl-methyl-aniline zinc chloride, 1-diazo-2-oxy-naphthalene-4-sulfonate, 4-benzoylamine-2-5-die-thoxy-benzene-diazonium chloride, p-chlorobenzene-sulfonate of 4-diazo-1-cyclohexylaniline, p-chlorobenzene-sulfonate of 4-diazo-2-methoxy-1-cyclo-hexylamino-benzene, tin chloride double salt of 4-N-methyl-cyclohexyl-amino-benzene-diazonium chloride, p-acetamino-benzene diazonium chloride, 4-dimethylamino-benzene diazonium chloride, 3-methyl-4-diethyl-amino-benzene diazonium chloride, 4-morpholine-benzene diazonium chloride, 4-piperidyl-2-5-diethoxy-benzene diazonium chloride, 1-dimethyl-amino-naph-thalene-4-diazonium chloride, 4-phenyl-amino benzene diazonium chloride. The diazonium compounds may be employed in the form of their stable diazonium salts such as sulfates, chlorobenzene sulfonates, borofluorides or, as is preferred in connection with the instant invention in the form of a double salt of an acidic reagent such as zinc chloride, stannic chloride, fluoroboric acid or cadmium chloride. It is immaterial, however, as to which complex or double salt is chosen so far as the effectiveness of the photo-oxidation reaction is concerned.

The useful dyes which may be employed in connection with the instant photopolymerization process include those dyes which are known as desensitizing dyes in silver halide photographic emulsions, as delineated in The Theory of the Photographic Process, Mees, C.E.K. and James, T.H., 3rd edition (1966), pages 228 and 229. These dyes include those classes of dyes which can be reversibly photoreduced in the presence of a mild reducing agent and can also be irreversibly photo-oxidized or bleached in the presence of a diazonium salt. Such dye classes include the phenazines, phenthiazines, thiazolyl dyes, phthaleins, azines, oxazines, and thiazines. More specifically, the useful dyes include but are not limited to phenosafranine having the formula:

Phenosafranine (phenazine)

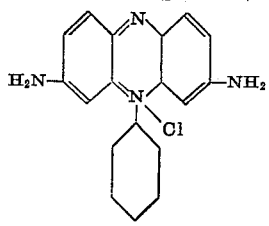

Amethyst Violet (phenazine)

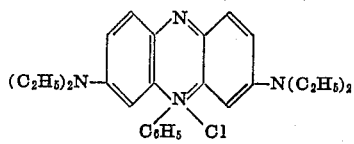

Methylene Blue (phenthiazine)

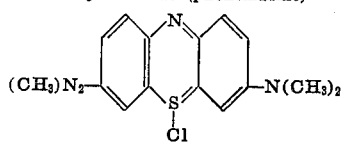

Fluorescein (phthalein)

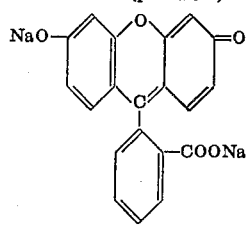

Eosine (phthalein)

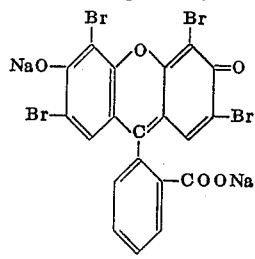

Erythrosine (phthalein)

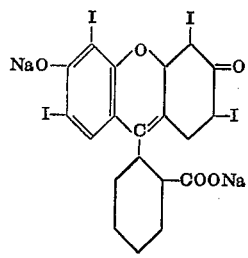

Rose Bengal (phthalein)

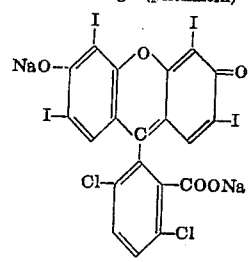

Thionine (phenthiazine)

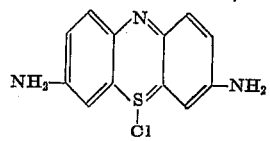

Brilliant Blue (oxazine)

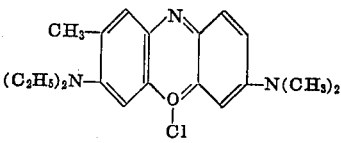

Pinakryptol Green (phenazine)

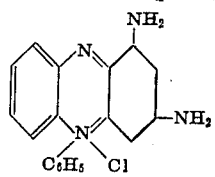

Those compounds commonly delineated as silver halide sensitizing agents are not suitable for use in connection with the instant invention. The dyes not suitable for use in the instant invention include cyanine, hemicyanine, merocyanine, styryl, azanol and oxanol dyes such as those disclosed in U.S. Pat. No. 3,099,558.

Any normally liquid to solid photopolymerizable unsaturated organic compound is suitable in the practice of my invention. Preferably, such compounds should be ethylenically unsaturated, i.e., contain at least one nonaromatic double bond between adjacent carbon atoms. Compounds particularly advantageous are the photopolymerizable vinyl or vinylidene compounds containing a $CH_2$ C< group activated by direct attachment to an electronegative group such as halogen, $$C=O, -C\equiv N, -C\equiv C, -O-$$

Examples of such photopolymerizable unsaturated organic compounds include acrylamide, acrylonitrile, N-ethanol acrylamide, methacrylic acid, acrylic acid, calcium acrylate, methacrylamide, vinyl acetate, methyl methacrylate, methyl acrylate, ethyl acrylate, vinyl benzoate, vinyl pyrrolidone, vinyl methyl ether, vinyl butyl ether, vinyl isopropyl ether, vinyl isobutyl ether, vinyl butyrate, butadiene or mixtures of ethyl acrylate with vinyl acetate, acrylonitrile with styrene, butadiene with acrylonitrile and the like. Increased photographic speeds may be obtained by the use of a bifunctional monomer such as N,N'-methylene bisacrylamide.

The instant invention may be employed with any suitable support material such as glass, metal, film or paper and colloidal binding or thickening agents may be employed. The useful colloidal binder or thickening agents may be those commonly employed such as polyvinyl pyrrolidone, polyvinylalcohol, hydroxyethylcellulose, gelatin, carboxy methyl cellulose, etc.

While the exact mechanism on which the present invention operates is presently unknown, it is thought that the mechanism might be similar to that of the following reactions:

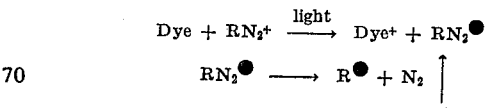

The loss of an electron by the dye yields a positive ion which may dissociate into fragments. Such a degradation of the dye would be accompanied by the disappearance of the characteristic dye color. Radicals such as $RN_2$ or R may result from the gaining of an electron by a diazonium positive ion. These radicals would be the polymerization iniators. While the actual mechanism is more complex, the above equations serve to explain how the products of the reaction may be achieved.

EXAMPLE I (a) To 5 ml. of water containing about 1 mg. methylene blue there was added in the absence of light 0.1 g. para toluene diazonium chlorozincate. The solution was then divided into two parts. One-half of the sample was exposed to the light from a 375 watt reflector lamp at a distance of 6 inches; the other half was retained in the dark. Bleaching of the dye took place in the sample exposed to light within a few seconds. A few bubbles of gas, probably nitrogen, also appeared in the solution. The unexposed sample showed no color change after a period of several hours. The bleached sample was stored overnight in a dark room. It was noted the next day that the solution had not regained its original color.

EXAMPLE II

The procedure of example I was repeated, substituting for the water 5 ml. of an aqueous solution of N,N'-methylene bisacrylamide, 4 percent. A white opaque polymer appeared in the exposed sample within a few seconds. No polymer had appeared in the unexposed sample after the lapse of several hours.

EXAMPLE III

The procedure of examples I and II was repeated, substituting P-toluene diazonium fluoborate for the P-toluene diazonium chlorozincate. The same results were observed as were described for examples 1 and 2.

EXAMPLE IV

The procedure of example I and II was repeated substituting rose bengal dye for methylene blue. The same results were observed as were described for examples 1 and 2.

EXAMPLE V

The procedure of examples I and II was repeated substituting rose bengal dye for methylene blue and also substituting P-toluene diazonium fluoborate for P-toluene diazonium chlorozincate. The results observed were similar to those achieved with examples 1 and 2.

EXAMPLE VI

The procedure of examples I and II was repeated substituting titan yellow dye for methylene blue. The results observed were similar to those reported for examples 1 and 2.

EXAMPLE VII

The procedure of examples I and II was repeated substituting titan yellow dye for methylene blue and also substituting P-toluene diazonium fluoborate for P-toluene diazonium chlorozincate. Results were observed which were similar to those noted for examples 1 and 2.

EXAMPLE VIII

The following light-sensitive solution was prepared in a dark room:

| | |
|---|---|
| Polyvinylpyrrolidone, K-90 (GAF) | 1.000 g. |
| N,N'-methylenebisacrylamide (recrystallized twice from water) | 0.250 g. |
| Methylene Blue (zinc-free) (Formula weight = 374) | 0.037 g. |
| para-toluene diazonium chlorozincate | 0.200 g. |
| "Wetsit,"* spreading agent, 10 percent aq. solution | 0.08 ml. |
| Water, to | 25.0 ml. |

* alkyl sulfonate blends

The solution was poured onto a glass plate which had been appropriately subbed to receive the solution. The coated plate was whirled 5 minutes on a coating machine (Addressograph-Multigraph) sulfonate blends then allowed to dry in the dark at room temperature for about an hour.

A sample was cut from the plate and exposed through a Stouffer Graphic Arts step tablet to the light from a 375-watt reflector lamp for a period of 1 minute at a distance of 15 inches. The light intensity as measured by an ultraviolet light-exposure meter read 640 microwatts per square cm. After the exposure the sample was washed by immersing in a tray of deionized water at room temperature for a few minutes. Further washing under a cold water tap served more completely to remove the unpolymerized areas. A polymeric image was achieved which showed seven steps of the step tablet.

EXAMPLE IX

The following light-sensitive solution was prepared in a dark room:

| | |
|---|---|
| Polyvinylpyrrolidone, K-90 (GAF) | 1.000 g. |
| N,N'-methylenebisacrylamide (recrystallized twice from water) | 0.250 g. |
| Rose bengal (Formula weight = 981) | 0.098 g. |
| Para-toluenediazonium fluoborate | 0.200 g. |
| "Wetsit," spreading agent, 10 percent aq. | 0.08 ml. |
| Water, to | 25.0 ml. |

The procedure for the coating of the glass plate and for the exposure of a sample thereof was the same as that described in example 8. After the washing step had removed the unpolymerized areas, a polymeric image remained which showed nine steps of the step tablet.

EXAMPLE X

The following light-sensitive solution was prepared in a dark room:

| | |
|---|---|
| Polyvinylpyrrolidone, K-90 (GAF) | 1.000 g. |
| N,N'-methylenebisacrylamide (recrystallized twice from water) | 0.250 g. |
| Titan Yellow (formula weight = 695) (recrystallized from methanol) | 0.070 g. |
| Para-toluenediazonium fluoborate | 0.200 g. |
| "Wetsit," spreading agent, 10 percent aq. | 0.08 ml. |
| Water, to | 25.0 ml. |

The procedure for coating of the glass plate and for the exposure of a sample thereof was the same as that described in example 8. After the unpolymerized areas had been removed by washing in water a polymeric image remained which showed four steps of the step tablet.

The above examples are illustrative of the manner in which the photopolymerizable compositions of the type disclosed herein can be used for the production of photographic polymeric relief images. Any of the photosensitive compositions contained in the preceding examples or otherwise mentioned herein may also be employed in a similar manner. Modifications of the instant invention will occur to those persons skilled in the art. We, therefore, do not intend to be limited in the patent grant except as necessitated by the appended claims.

I claim:

1. A process for photopolymerizing a normally liquid to normally solid monomer containing the grouping $CH_2=C<$ comprising exposing said monomer to electromagnetic radiation having a wave length extending from the ultraviolet through the visible range in the presence of a catalytic mixture which consists essentially of a light sensitive para toluene diazonium compound and a dye selected from the class consisting of phenazines, phenthiazines, phthaleins, azines, oxazines, and thiazines.

2. The process as defined in claim 1 wherein the dye is a phenazine.

3. The process as defined in claim 1 wherein the dye is a phenthiazine.

4. The process as defined in claim 1 wherein the dye is a phthalein.

5. The process as defined in claim 1 wherein the dye is an azine.

6. The process as defined in claim 1 wherein the dye is an oxazine.

7. The process as defined in claim 1 wherein the dye is a thiazine.

8. The process as defined in claim 1 wherein the electromagnetic radiation is visible light.

9. A process of producing by photopolymerization a polymeric photographic image which comprises irradiating to electromagnetic radiation having a wave length extending from the ultraviolet through the visible region, a photographic element comprising the support having thereon a radiation sensitive layer comprising a normally liquid to normally solid monomer containing the grouping $CH_2=C<$ and a colloidal carrier therefore and a catalyst for said polymerization comprising a mixture consisting essentially of a light sensitive para toluene diazonium compound and a dye selected from the class consisting of phenazines, phenthiazines, phthaleins, azines, oxazines, and thiazines, thereby polymerizing the monomers in the exposed areas and then removing the residual monomers in the unexposed areas by washing.

10. The process of claim 9 wherein the exposing radiation is visible light.

11. The process as defined in claim 9 wherein the colloid carrier is gelatin.

12. A radiation sensitive photographic element comprising a support and having thereon a light sensitive layer comprising a mixture of a normally liquid to normally solid monomer containing the grouping $CH_2=C<$, a photographic colloid carrier therefore, and a photopolymerization catalyst mixture consisting of a light sensitive, para toluene diazonium compound and a dye selected from the group consisting of phenazines, phenthiazines, phthaleins, azines, oxazines, and thiazines.

13. The element as described in claim 12 wherein the photographic colloidal carrier is gelatin.

14. The process as defined in claim 9 wherein the colloidal carrier is polyvinylpyrrolidone.

15. The element as defined in claim 12 wherein the photographic colloidal carrier is polyvinylpyrrolidone.